United States Patent [19]

Thompson

[11] Patent Number: 4,587,686
[45] Date of Patent: May 13, 1986

[54] WINDSHIELD WIPER

[76] Inventor: William E. Thompson, R.R. 1, Box 89, Middletown, Ind. 47356

[21] Appl. No.: 640,969

[22] Filed: Aug. 15, 1984

Related U.S. Application Data

[63] Continuation-in-part of Ser. No. 475,081, Mar. 14, 1983, Pat. No. 4,490,880.

[51] Int. Cl.$^4$ .............................................. A47L 1/00
[52] U.S. Cl. .............................. 15/250.42; 15/250.36
[58] Field of Search ......................... 15/250.32–250.42

[56] References Cited

U.S. PATENT DOCUMENTS

| | | | |
|---|---|---|---|
| 1,915,775 | 6/1933 | Christen | 15/250.03 |
| 2,036,787 | 4/1936 | Zabriskie | 15/250.36 X |
| 2,543,383 | 2/1951 | Scinta et al. | 15/250.4 |
| 3,200,431 | 8/1965 | Thompson | 15/250.41 |

Primary Examiner—Peter Feldman
Attorney, Agent, or Firm—Woodard, Emhardt & Naughton

[57] ABSTRACT

A windshield wiper assembly providing improved wiping characteristics. The wiper assembly includes a wiper arm, a superstructure, and a flexible wiper insert received within the superstructure. The wiper insert includes a flexible elongate beam received within the superstructure at both ends and which serves to uniformly distribute the force transmitted by the superstructure from the wiper arm along the length of a flexible wiper strip which forms a part for the wiper insert. In its unflexed configuration, the elongate beam is characterized by a first surface which is elliptically curved convexly along the length of the beam and a second oppositely disposed surface which is flat. When the elliptically curved surface is flexed due to the application of a force from the superstructure at each end of the beam the force is equally distributed along the length of the beam.

9 Claims, 11 Drawing Figures

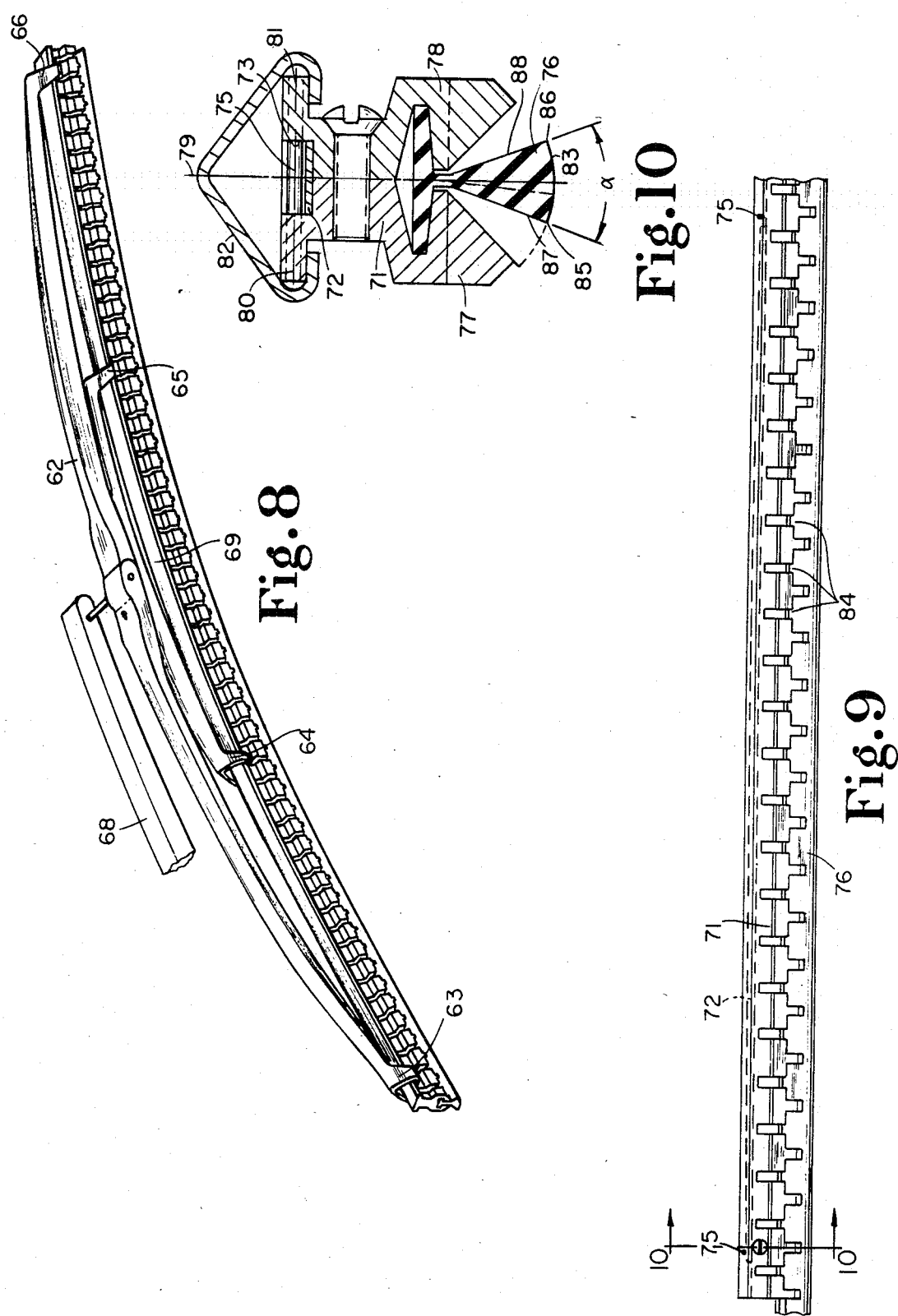

WINDSHIELD WIPER

CROSS-REFERENCE TO RELATED APPLICATION

This application is a continuation-in-part application of my co-pending patent application Ser. No. 475,081 filed Mar. 14, 1983, now U.S. Pat. No. 4,490,880.

BACKGROUND OF THE INVENTION

The present invention relates in general to flexible window wiping devices and, more particularly, to flexible windshield wiping devices.

A common defect in conventional automotive windshield wipers is observed when the surface which has been wiped on the windshield is left with bands or streaks. This defect is at least partially due to the failure of the wiper assembly to apply a uniform wiping force against the length of the wiper blade and thus also to the surface of the windshield. The lack of uniformity in the wiping force applied to the wiper blade is characterized by conventional wiper assemblies having superstructures which apply a force load upon the wiper blade at only relatively widely spaced intervals. As a result little, if any, force may be available at various locations between these spaced intervals.

Although the field of windshield wipers encompasses a relatively large number of issued patents depicting a variety of different designs, it may be fairly said that windshield wiper designs generally depict a commonality of approaches to their basic function. Thus, most windshield wipers are characterized by a superstructure which distributes the force applied by the central wiper arm, an intermediate wiper blade support member, and a flexible wiper blade insert which directly performs the function of wiping the windshield. Just as the great variety of windshield wiper designs share a certain commonality of structure, they also share certain disadvantages in carrying out the basic task at hand. For example, modern windshield wiper assembly designs must have some type of force distributing means to distribute the force applied by the wiper arm along the length of the flexible wiper blade. This is necessary because the wiper blade needs to be able to flex along its length in order to remain in wiping contact with a windshield surface having a varying radius of curvature. Conventional wiper assemblies typically employ a superstructure having a primary yoke attachable to the wiper arm and a pair of secondary yokes attached at each end of the primary yoke and which serve to distribute the force exerted on the superstructure from the wiper arm at four evenly spaced intervals along its length. Since these intervals are still rather widely spaced little, if any, force may be available at various locations between these intervals. Thus, while this design provides some measure of increased force distribution along the length of the wiper blade, it is inherently incapable of providing or even approaching to provide equal force distribution at all points along the length of the blade.

Various attempts have been made to improve the distribution of force applied by the wiper arm along the length of the wiper blade. For example, U.S. Pat. No. 3,104,412 to Hinder discloses a resilient backing member or superstructure made of molded plastic having a concave face with a curvature substantially equivalent to the maximum curvature of the wiped windshield surface. The backing member is directly attached to the flexible wiper blade. This arrangement is believed to be inherently unable to provide equal force distribution when the radius of curvature varies along the length of the blade.

U.S. Pat. No. 4,028,770 to Appel discloses a windshield wiper blade assembly having a single piece resilient backbone member or superstructure. Uniform wiping pressure is assertedly achieved by forming the superstructure so as to have a uniform radius of curvature which is less than that of the windshield surface to be traversed together with varying the width and/or thickness of the superstructure from a maximum through the central arm attachment point to a minimum through the central arm attachment point to a minimum at the opposite ends thereof, with the width and/or thickness and degree of curvature being proportioned or correlated with the modulus of elasticity, load and length of the blade. This design, as well as that in the aforementioned U.S. Pat. No. 3,104,412 suffer the inherent disadvantage that each superstructure's shape will need to be varied for each differently shaped windshield, thus making standardization difficult, if not impossible to obtain. A further disadvantage results from the fact that the pressure distribution design is incorporated in a single piece superstructure preventing its adaption to existing conventional type superstructures.

In my U.S. Pat. No. 4,342,129 issued Aug. 3, 1982, I disclosed the use of a pre-stressed convex shaped intermediate support member between a conventional type superstructure and wiping blade which serves to more uniformly distribute along the length of the wiper blade the forces applied by the superstructure at spaced intervals. A pre-stressed convex shaped flexor element having a similar function is disclosed in U.S. Pat. No. 2,290,336 to Anderson. While I have found the type of approach incorporated in this design to offer some improvement in force distribution between the force application spaced intervals in conventional superstructures, this design still results in undesirable force variations along the wiper blade length and it involves difficult and costly procedure to pre-stress the intermediate support member. The present invention solves such problems in that it offers improved force distribution characteristics while at the same time being easier to manufacture than the above-mentioned devices.

Another problem which is encountered in wiping windshields involves the design of the flexible wiping blade or insert. The majority of wiping insert designs incorporate a blade which tapers to a relatively narrow lip which is bent from side to side as it wipes the windshield surface by contact with the side surface of the lip. The problems of this type of design are outlined in my aforementioned U.S. Pat. No. 4,342,129 which is hereby incorporated in this application for all purposes. As I disclosed therein, the use of the rolling sector type wiping insert provides a more advantageous design which permits the wiping surface to configure an edge in order to scrape the windshield surface rather than merely slide across it. However, due to non-conformal differences which may occur between the surface of the windshield and the wiping element retainer it has been found that portions of the surface area immediately adjacent to the contacting edge may become compressed into contact with the windshield. The present invention solves such problems by providing a radial clearance behind the contacting edge and/or lagging the contacting edge so that the windshield surface is not tangent to the rolling sector at any point except the edge.

Non-conformal differences between the wiped surface and the wiping element retainer can occur either as a result of the inability of the wiper assembly to follow the surface contour of the wiped surface or from any variations in the spring load which holds the wiper blade against the wiped surface. The present invention also provides improvements to the rolling-sector type wiping insert disclosed in my U.S. Pat. No. 4,342,129 which provide for an adequate range of elastic deformation when under normal load. Thus, small variations plus or minus from normal load or non-conformal surface to retainer element deviations will not adversely effect wiping efficiency.

SUMMARY OF THE INVENTION

One embodiment of the present invention is characterized by a force distribution device arranged for receipt by the superstructure of a windshield wiper assembly including a cantilever spring wiper arm, a superstructure and a flexible wiping blade. The device includes at least one resilient elongate member having top and bottom facing surfaces and arranged for receipt at both its ends within the superstructure. Each member is flexible in a plane perpendicular to the surface of a windshield being wiped from an unbiased configuration wherein the top facing surface is planar and the bottom facing surface is curved along the length of the member, to a biased configuration wherein the top facing surface is curved along the length of the member. In the biased configuration the member serves to equally distribute the force applied to it by the cantilever spring arm via the superstructure to cause the adjacent portion of the wiping blade to be forced against the surface to be wiped.

Accordingly, it is an object of the present invention to provide an improved windshield wiper.

Related objects and advantages of the present invention will be apparent from the following description.

BRIEF DESCRIPTION OF THE DRAWINGS

FIG. 8 is a perspective view showing an alternative preferred embodiment of the present invention received in a conventional type superstructure.

FIG. 9 is an enlarged fragmentary elevation view of the FIG. 8 wiping insert of the present invention.

FIG. 10 is an enlarged section view taken along line 10—10 in FIG. 9.

DESCRIPTION OF THE PREFERRED EMBODIMENT

Figure 1:
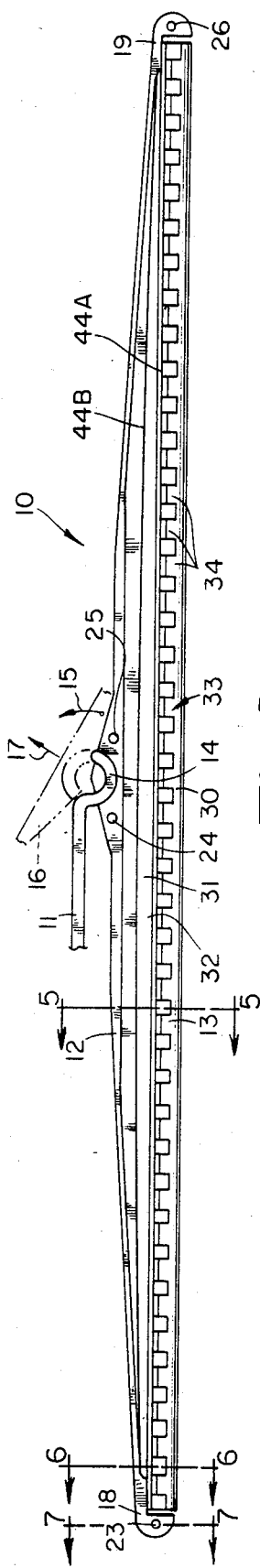
FIG. 1 is a fragmentary elevation view of the windshield wiper assembly of the present invention in the flexed position with certain sections removed in order to more clearly show the novel force distribution means.

For the purpose of promoting an understanding of the principles of the invention, reference will now be made to the embodiment illustrated in the drawings and specific language will be used to describe the same. It will nevertheless be understood than no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings, FIG. 1 shows a preferred embodiment of the wiper assembly of the present invention generally designated at 10 in a position which it would assume when it is forced against a flat surface. Wiper assembly 10 includes a cantilever spring wiper arm 11, superstructure 12 and wiper insert 13. It is to be understood that if wiper assembly 10 were free of any applied forces, wiper insert 13 would have a convexly curved configuration along its length. It is also to be understood that superstructure 12 consists of two halves which are normally bolted together, and FIG. 1 shows one of the halves removed to more clearly view internal features of assembly 10.

As seen in FIG. 1, wiper arm 11 employs a novel arrangement for quickly connecting and disconnecting it to superstructure 12. Thus, wiper arm 11 has a hook shaped tip 14 which is uniformly curved and adapted to be received within a similarly curved aperture in superstructure 12. Arrow 15 indicates the direction of pivoting around the center of tip 14 in order to detach superstructure 12 from wiper arm 11. A portion of superstructure 12 is shown in broken lines at 16 at the position it would assume when it has been pivoted sufficiently to allow its removal from wiper arm 11. Of course, it is to be understood that wiper arm 11 must be raised from the surface of a windshield a sufficient distance to allow superstructure 12 to be pivoted in this manner. Once superstructure 12 has been pivoted to the position at 16, it may be simply disattached from wiper arm 11 by withdrawing the superstructure therefrom in the direction of arrow 17. It is thus seen that superstructure 12 may be quickly attached and removed from wiper arm 11 and without needing any tools to perform this operation.

Figure 6:
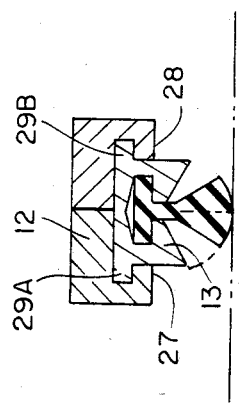
FIG. 6 is a section view taken along line 6—6 in FIG. 1.
Figure 7:
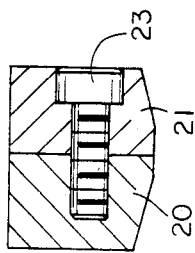
FIG. 7 is a section view taken along line 7—7 of FIG. 1.

Proceeding now to other features of wiper assembly 10, it is to be appreciated that wiper insert 13 is attached to superstructure 12 only at ends 18 and 19. This feature represents a significant departure from conventional wiper assemblies which employ a superstructure adapted to receive the wiper insert at at least four spaced apart locations along the length of the insert. The reasons for this departure will be made apparent hereinafter. Thus, superstructure 12 is arranged to transmit the force applied by cantilever spring wiper arm 11 at the center of superstructure 12 to ends 18 and 19. Referring also to FIG. 7, superstructure 12 is formed of two symmetrically shaped halves 20 and 21 which are bolted or secured together at locations 23-26. FIG. 6 shows superstructure 12 having two inwardly protruding flanges 27 and 28 which serve to retain two outwardly protruding flanges 29A and 29B on wiper insert 13 in a clamped in arrangement at its ends. It is to be appreciated that while FIG. 6 illustrates the connection between wiper insert 13 and superstructure 12 at end 18 thereof, a similar connection arrangement is present at end 19 of superstructure 12.

Wiper insert 13 is seen in FIG. 1 to include flexible wiper strip 30 and a wiper strip retainer 31. Details of the construction of the flexible wiper strip 30 will be discussed later herein. The upper section of wiper strip retainer 31 comprises an elongate beam portion 32 which serves to transmit the force applied by superstructure 12 at its ends evenly along the length of wiper strip 30 in a manner which will be fully described later herein. The lower section of wiper strip retainer 31 includes a wiper strip retaining means generally designated at 33 which is notched at a number of equally spaced intervals 34 along the entire length thereof. These notches or intervals 34 serve to permit elongate beam portion 32 to evenly distribute the force applied by superstructure 12 under conditions when wiper insert 13 flexes along its length in order to conform to the curvature of a windshield, with the sections between the notches serving to retain the flexible wiper strip and the elongate beam portion above the notches serving to apply uniform load distribution. The number, size and shape of notched intervals 34 will vary depending upon the desired load distribution and flexing characteristics of wiper assembly 10. In the preferred embodiment the length of each segment of retaining means 33 compared to the corresponding adjacent notched interval 34 is in the ratio of 3 to 4.

Figure 2:
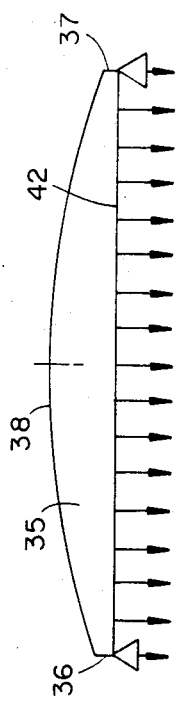
FIG. 2 is an illustration of a force-load distribution of a beam of uniform strength supported at both ends.
Figure 4:
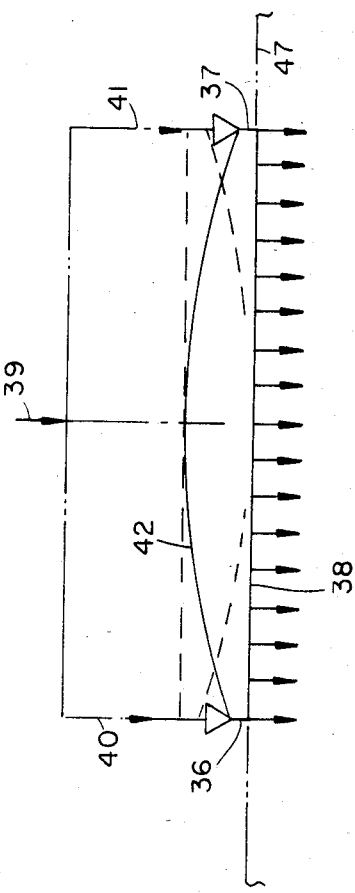
FIG. 4 illustrates the flexing characteristics of the uniform strength beam of FIG. 3 when equal forces are applied at both ends in order to force the beam against a flat windshield surface.
Figure 3:
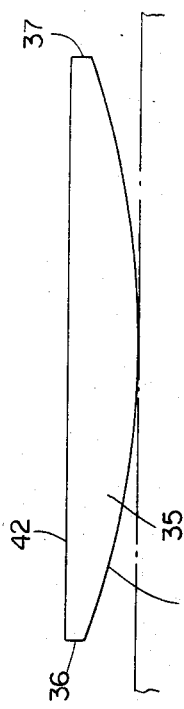
FIG. 3 illustrates the beam of FIG. 2 inverted to correspond to the position of the elongate beam portion of FIG. 1.

Referring now to details of construction of elongate beam portion 32 of wiper strip retainer 31, FIGS. 2–4 illustrate the general shape characteristics of beam portion 32 which enable its novel uniform force distribution characteristics. FIG. 2 illustrates the general shape of a uniform strength beam 35 having the characteristic of uniform load distribution along its length when supported only at ends 36 and 37. It is to be understood that while elongate beam portion 32 of wiper strip retainer 31 differs in certain dimensional respects from beam 35, elongate beam portion 32 has all of the general shape characteristics of beam 35 which will be disclosed herein. It is to be appreciated that in order to obtain the uniform load distribution characteristic, beam 35 has a constant thickness, a flat surface 42, and an oppositely disposed convex surface 38 which is elliptically curved along the entire length of beam 35. In addition, the maximum height of beam 35 is one-half the length of the minor axis of the ellipse formed by the elliptically curved convex surface 38 of beam 35, while the minimum height of beam 35 is one-half its maximum height. FIG. 3 shows beam 35 inverted into the position it would have within wiper assembly 10. Thus, the elliptically curved convex surface 38 of beam 35 corresponds to the bottom facing surface 44A of elongate beam portion 32 and the flat surface 42 of beam 35 corresponds to the top facing surface 44B of elongate beam portion 32.

FIG. 4 illustrates that by constructing a beam having the shape characteristics of beam 35 from a material having a suitable elastic modulus, beam 35 may be flexed so as to conform its elliptically curved convex surface 38 against a windshield surface 47 by applying equal forces at its ends. When this occurs, the previously flat surface 42 of beam 35 becomes convexly elliptically curved along its length and the forces 40 and 41 applied at the ends are uniformly distributed along the length of the beam. Further, although windshield surface 47 is shown to be flat along the segment depicted in FIG. 4, it is to be understood that beam 35 has an adequate elastic range to allow it to conform to the maximum curvature of the windshield surface which is encountered.

The force-load distribution depicted by arrows 39–41 in FIG. 4 is identical to the force-load characteristics encountered by beam portion 32 of wiper strip retainer 31 during operation of wiper assembly 10. Thus, arrow 39 depicts the central load applied by cantilever spring arm 11 while arrows 40 and 41 depict the function of superstructure 12 in distributing this central force into two equal forces at the ends of superstructure 12. When the forces from superstructure 12 are applied at the ends of beam portion 32, beam portion 32 flexes so as to conform to the shape of the surface against which it is forced. Because a windshield surface is curved, it is necessary to construct beam portion 32 so that when the predetermined force is applied by spring arm 11, beam portion 32 is able to conform to the maximum curvature of the windshield. Thus, it must be appreciated that when beam portion 32 is flexed to conform to the curvature of a windshield the normally convexly curved surface 43 becomes concave in shape.

It is to be understood that the exact shape and dimensions of beam portion 32 is dependent upon the dimensions of the wiper assembly, the spring force of the wiper arm and modulus of elasticity of the material from which the beam is constructed. Because different materials may have a different modulus of elasticity, the particular material selected for beam portion 32 may vary depending upon the specific design of wiper assembly 10. In the preferred embodiment depicted in FIG. 1, wiper strip retainer 31 is made from acetal.

Figure 5:
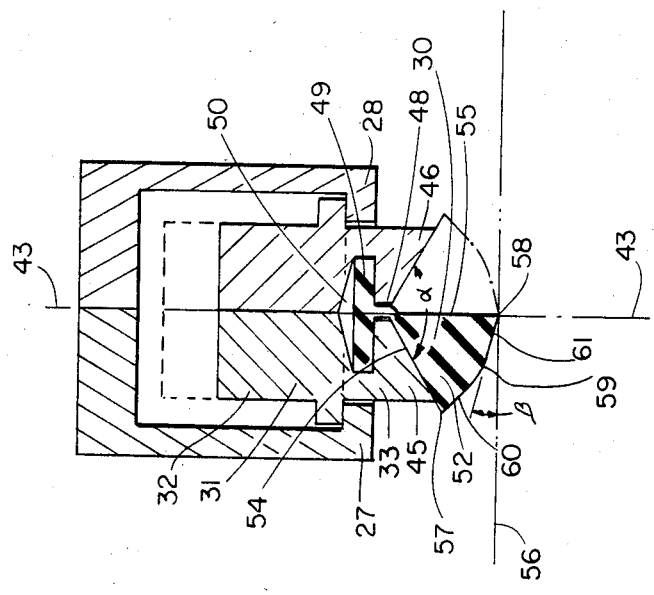
FIG. 5 is an enlarged section view taken along line 5—5 in FIG. 1.

Referring now to FIG. 5 the particular construction of flexible wiper strip 30 and wiper strip retaining means 33 will now be described. It may be noted that superstructure 12 and wiper insert 13 are symmetrically configured about vertical center line 43. It is also to be noted that although FIG. 5 is a lateral cross section, wiper strip 30 and retaining means 33 extend along virtually the entire length of wiper assembly 10 with the same cross section shape as is depicted here. It is also to be noted that although superstructure 12 and elongate beam portion 32 are symmetrical about center line 43, the vertical height of their cross sections along centerline 43 will vary depending upon where along the length of wiper assembly 10 the cross section is taken. Retaining means 33 includes two downwardly protruding and laterally extending arm portions 45 and 46 which define an included angle alpha between them. Arm portions 45 and 46 serve as lateral stops for the movement of wiper strip 30. Positioned centrally between arm portions 45 and 46 is a central vertical channel 48 which is enlarged at its upper end in order to receive retainer portion 49 of wiper strip 30. It is to be noted that wiper strip 30 is flanged at retainer portion 49 so that strip 30 may be inserted with retaining means 33 by sliding retainer portion 49 lengthwise through channel 48. It is also to be appreciated that flexible wiper strip 30 is made from a rubber material which allows strip 30 to be sized for a slip fit inside channel 48. It is also to be appreciated that channel 48 has been constructed so that there is a clearance space 50 above the flanged retainer portion 49. Clearance space 50 is V-shaped symmetrically on vertical center line 43 such that vertical clearance above retainer portion 49 is a maximum along center line 43. This arrangement permits wiper strip 30 to deflect vertically by flexing upwardly within clearance space 50 in order to provide some dimensional flexibility within wiping strip 30 and between retainer means 32 and the windshield surface.

Wiper strip 30 also includes an enlarged wiping portion 52 which protrudes laterally beyond retainer means 32. Wiping portion 52 has a general sector-shaped cross section with side surfaces 54 and 55 forming the radii of the sector. The circumferential ends of surfaces 54 and 55 terminate at edges 57 and 58 which serve as wiping edges for edge contact with the surface of a windshield to be wiped. The circumferential surface portion of enlarged wiping portion 52 is characterized by a centrally disposed uniformly curved surface portion 59 and two flat surface portions 60 and 61 which extend tangentially from curved surface portion 59 and merge into corresponding edges 57 and 58. It is to be appreciated that the included angle between side surfaces 54 and 55 is approximately one half the size of the angle alpha which is defined herein as the included angle between arm portions 45 and 46. This allows wiper edges 57 and 58 to alternately contact the windshield surface in such a manner that corresponding side surfaces 54 and 55 will extend perpendicularly from the windshield surface along center line 43 while the other one of the side surfaces 54 or 55 abuts against the corresponding arm portion 45 or 46. In the situation where edge 58 forms the wiping edge for wiper strip 30, it is seen that flat surface portion 61 forms an angle beta with windshield surface 56. While the size of the angle beta may change for differently designed wiper assemblies, in this embodiment a value for angle beta in the range of 5-15 degrees has been found to be acceptable. Thus, flat surface portion 61 provides a clearance space behind edge 58 which would otherwise not be present if curved portion 59 were allowed to merge into edge 58. The clearance space provided by this arrangement ensures that edge contact will be maintained at edges 57 and 58 even if certain small non-conformal pressure differences occur along the length of wiper strip 30.

FIGS. 8-10 depict an alternative style wiper insert which is adapted for installation in conventional type superstructures. As can be seen in FIG. 8, there are four pressure points 63-66 which are associated with the claws of conventional superstructure 62. These four pressure points represent the points of maximum pressure applied by superstructure 62 from a conventional style wiper arm 68. It can be appreciated that there are three spaces of equal length between these four pressure points and along which the force applied at these pressure points must be equally distributed. In order to accomplish this, three force distribution beams 72 are incorporated in the wiping insert which is generally designated at 69 (FIG. 8). It is to be understood that each of the beams 72 have all of the shape characteristics and force distribution characteristics of beam 35 depicted in FIGS. 2-4. Each of the three force distribution beams 72 extends between a different two of the four pressure points 63-66 and spans one-third of the total length between pressure point 63 and pressure point 66. In this embodiment, beams 72 are separate members from the wiper strip retaining means 71. Referring also to FIG. 10, each of the force distribution beams 72 are fit lengthwise within a channel 73 which runs the entire length of the upper portion of wiping means 71. It is to be noted that while FIG. 10 is a lateral cross section, reattaining means 71 and wiper strip 76 extend along the entire length of wiper insert 69 with the same cross section shape as depicted here. Each of the force distribution beams 72 are held in place at their ends by pins 75. It is to be noted that retaining means 71 is a two-piece structure consisting of two halves 77 and 78 which are symmetric about a central axis 79. The upper portion of retaining means 71 includes two outwardly extending flanges 80 and 81 which serve to permit retaining means 71 to be received lengthwise in the claws 82 of superstructure 62.

FIG. 10 also depicts an alternative arrangement for the enlarged wiping portion 52 of wiper strip 30 which provides clearance space behind the contacting edge without the necessity of flat portions 60 and 61. In this arrangement, curved surface portion 83 of wiper strip 76 forms the entire surface between edges 85 and 86. In order to obtain vertical clearance behind edges 85 and 86, the included angle alpha between side surfaces 87 and 88 is decreased approximately five degrees to allow the contacting edge to lag slightly behind the position shown in FIG. 5. Thus, when one of edges 85 and 86 contacts the windshield surface, the corresponding side surface 87 or 88 will not be perpendicular to the windshield surface. Thus, curved portion 83 will merge into the contacting edge 85 or 86 at an angle of approximately five degrees with respect to the surface of the windshield, thereby preserving a vertical clearance space behind the contacting edge. This arrangement permits a sector shape to be maintained for rolling wiper strip 76 between positions which alternate the edges 85 and 86 in contact with the windshield surface. It may further be appreciated that while the arrangement of wiper strip 76 depicted in FIG. 10 is shown received in a retaining means adapted for use with conventional type superstructures, this arrangement may also be used with the superstructure of FIG. 1. It is also to be noted that retaining means 71 permits the use of flexible wiper strip 30 which was described in the previous alternative preferred embodiment. Also, as with previous alternative preferred embodiment, a series of spaced apart notches or intervals 84 (FIG. 9) have been provided along the length of retaining means 71 to permit satisfactory transfer of the evenly distributed pressure applied by each of the force distribution beams 72 along the length of retaining means 71. Because of the different dimensional characteristics of each of the three beams 72 from beam portion 32 of the previous preferred embodiment and also the different forces applied by superstructure 62, beams 72 are constructed from aluminum alloy. This construction affords a suitable modulus of elasticity for beams 72 to flex as desired under the forces applied by conventional superstructure 62.

It is thus seen that the above description discloses a simple yet superior design for improving the wiping efficiency in windshield wiper assemblies. The uniform force distribution provided by the flexible and elliptically curved beam design is believed to present inherent advantages over previous pre-stressed and curved uniform force distribution members. Since no pre-stressing is necessary, the force distribution characteristics of the beam design of the present invention can be more accurately controlled during manufacture in addition to being much easier to manufacture. These features, combined with the further advantage afforded by the design's adaptation to conventional superstructures is simply not present in any previous design.

Figure 11:
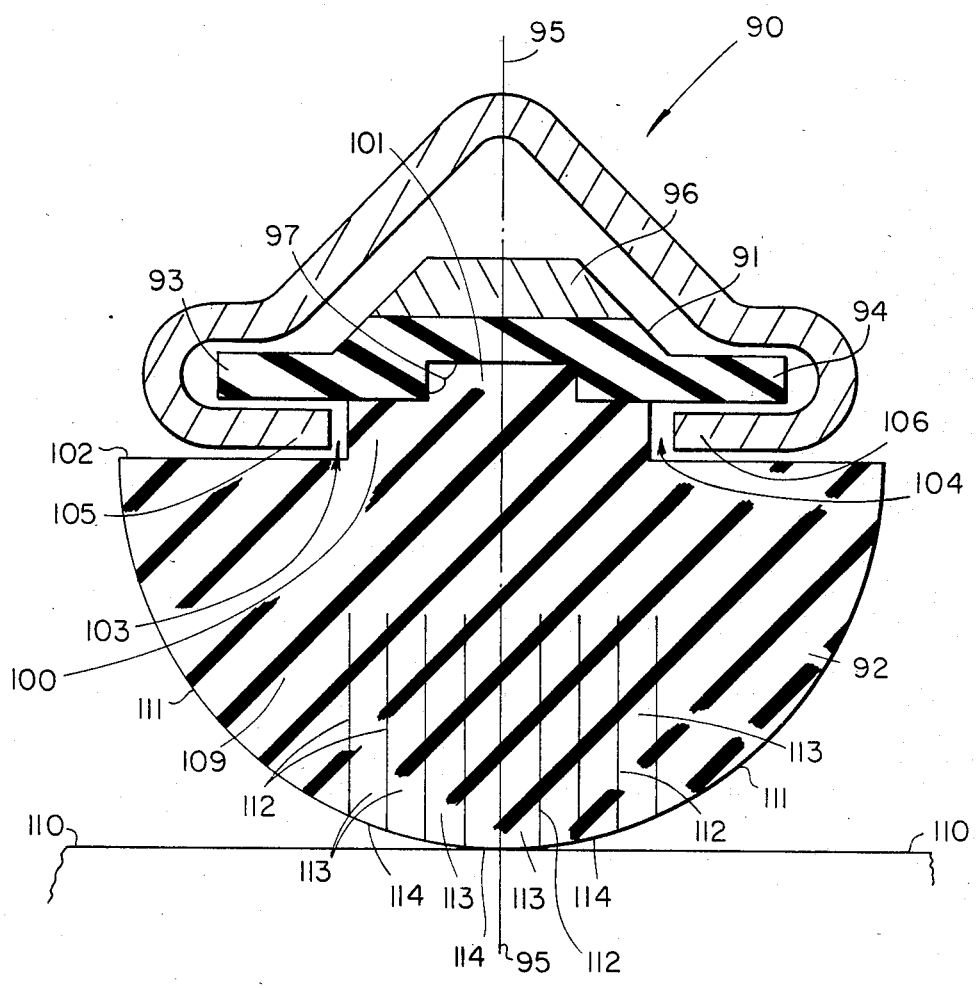
FIG. 11 is an end elevation view in full section of another embodiment of the present invention.

Referring to FIG. 11, there is illustrated in full cross section a yet further embodiment of the present invention. This embodiment incorporates many of the same concepts, benefits and improvements offered by the foregoing embodiments, yet still provides additional improvements. Self-conforming wiper 90 includes a hard rubber strip 91 and a softer rubber wiping member 92. Strip 91 has a pair of outwardly extending flanges 93 and 94 which are symmetrically disposed about the imaginary and longitudinal centerline plane which is indicated by line 95. The top surface of strip 91 receives an elliptical support beam 96 and the underside of strip 91 is recessed with channel 97.

Member 92 includes an upper longitudinal boss strip 100 and uppermost rib 101. Strip 100 abuts against the underside of strip 91 and rib 101 is snugly received by channel 97. The undercut (recessed) nature of strip 100, relative to surface 102, in combination with flanges 93 and 94 provides two opposite channels 103 and 104 for receipt of superstructure arms 105 and 106. A suitable adhesive is used to join strip 91 and member 92 and once joined, these two components are freely assembled into the superstructure. Strip 91 has a hardness range of between 90 and 95 durometers and member 92 has a hardness level of approximately 40 durometers.

Member 92 further includes a semi-cylindrical portion 109 which extends symmetrically about plane 95 downwardly from surface 102. Curved surface 111 is placed in contact against the windshield surface 110 and is held there due to the contacting force transmitted to the wiping element by the superstructure. A series of longitudinal slits 112 which extend upwardly toward surface 102 and are substantially parallel to plane 95 divide portion 109 into a plurality of wiping flaps 113. Each flap has a curved bottom surface 114, parallel sides which are formed by the longitudinal slits 112 and each flap terminates along an imaginary yet common horizontal line which is substantially parallel to surface 102 and is spaced from surface 102 by approximately 0.1 inches (2.54 mm).

As the wiper is moved from side to side across the windshield, the softer nature of member 92 permits it to bend and flex and adsorb some force by means of compression. As these dynamic changes occur within member 92, the individual wiping flaps deflect and become oriented with a slight convex shape on its leading surface (facing the direction of wiper movement) and a slight concave shape on its trailing surface.

Movement of wiping member 92 and resulting deflection of the flaps cause the individual curved bottom surface of each flap to become reoriented relative to the windshield surface. This reorientation which reverses about centerline plane 95 from side to side as the wiper moves across the windshield creates against the windshield the presence of at least one scraping edge from one of the flaps. Under most conditions, depending on the curvature of the windshield (typically a compound curvature), several scraping edges are provided. While these scraping edges of the individual flaps are not always the same edges due to the movement of the windshield wiper and the curvature variances of windshields, each of these edges which are placed in contact with the windshield surface do provide the beneficial wiping and scraping action as previously described.

In the case of this particular embodiment where a multi-slit wiper is applied, it need not hinge from side to side as with a conventional single edge wiper element because of the fact that any of the individual flap-like portions which are disposed between the parallel slits and which are tangent to the wiper surface, form the wiping edge as previously described. Each flap is flexible enough to form a "trailing" angle to the surface of the windshield while at the same time being backed up and supported by either those flaps which are disposed behind the trailing edge of the scraping flap edge or by the relatively heavier edge section which is disposed between surface 102 and the outermost slit. The harder rubber strip 91 provides the strength and durability needed to securely hold and anchor the softer wiping member into the superstructure.

As is illustrated in FIG. 11, an elliptical support beam 96 is included as part of this embodiment, and in accord with the design and function of such a beam as previously described, it serves to uniformly deliver, along the length of the adjacent wiper portion, the force transmitted to it by the superstructure. One earlier embodiment of the present invention incorporated a single elliptical beam with force-applied points at each end of the beam (see FIGS. 1-4). In another earlier embodiment of the present invention, three individual elliptical beams were provided and were arranged between four pressure points in order to provide two points of force pressure on each beam, and as before at the ends of those beams (see FIGS. 8-10). It is to be understood that the embodiment of FIG. 11 is suitable for use with virtually any style of superstructure including those of FIGS. 1 and 8. Consequently, the elliptical beam disclosed in FIG. 11 will be either a single-piece unit as previously described, or will represent one of a plurality of individual beams, the length and number of each beam depending on the superstructure design and the number of pressure points provided by that particular superstructure.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A windshield wiper insert suitably arranged for receipt by a windshield wiper superstructure, said windshield wiper insert comprising:
   a wiper retainer member suitably designed and arranged for retained receipt by said superstructure; and
   a unitary, part-cylindrical wiping element assembled to said wiper retainer member, said wiping element having a substantially flat surface and a convex curved surface wherein said curved surface being arranged with a plurality of substantially parallel wiping flaps which are defined by substantially parallel slits, said slits beginning at said curved surface and extending toward said substantially flat surface.

2. A windshield wiper insert suitably arranged for receipt by a windshield wiper superstructure, said windshield wiper insert comprising:
   a wiper retainer member suitably designed and arranged for retained receipt by said superstructure;
   a part-cylindrical wiping element assembled to said wiper retainer member, said wiping element having a substantially flat surface and a curved surface wherein said curved surface being arranged with a plurality of substantially parallel wiping flaps which are defined by substantially parallel slits, said slits beginning at said curved surface and extending toward said subtantially flat surface; and a resilient force distribution member cooperatively arranged with said wiper retainer member and suitably designed for receipt at opposite ends within said superstructure, said resilient force distribution member being flexible in a plane perpendicular to the wiped surface of a windshield from an unbiased configuration wherein its top surface is planar and its bottom surface is convexly curved along the length to a biased configuration wherein said top surface is convexly curved along the length.

3. The windshield wiper insert of claim 2 which includes at least one additional resilient force distribution member substantially identical to said first resilient force distribution member and arranged adjacent said first resilient force distribution member in an end-to-end relationship.

4. A windshield wiper insert suitably arranged for receipt by a windshield wiper superstructure, said windshield wiper insert comprising:

a wiper retainer member suitably designed and arranged for retained receipt by said superstructure; and a semi-cylindrical wiping element assembled to said wiper retainer member, said wiping element having a substantially flat surface and a curved surface wherein said curved surface being arranged with a plurality of substantially parallel wiping flaps which are defined by substantially parallel slits, said slits beginning at said curved surface and extending toward said substantially flat surface, and wherein said substantially flat surface is coincident with a diameter of said semi-cylindrical wiping element wherein said substantially parallel slits are arranged substantially normal to said flat surface.

5. The windshield wiper insert of claim 4 wherein said wiper retainer and said semi-cylindrical wiping element are each symmetrically arranged about a centerline plane, and wherein said substantially parallel slits are symmetrically disposed as to number and spacing on each side of said centerline plane.

6. A windshield wiper insert suitably arranged for receipt by a windshield wiper superstructure, said windshield wiper insert comprising:

a wiper retainer member suitably designed and arranged for retained receipt by said superstructure;

a part-cylindrical wiping element assembled to said wiper retainer member, said wiping element having a substantially flat surface and a curved surface wherein said curved surface being arranged with a plurality of substantially parallel wiping flaps which are defined by substantially parallel slits, said slits beginning at said curved surface and extending toward said substantially flat surface; and said wiper retainer member including a recessed channel and said part-cylindrical wiping element including a longitudinally extending raised boss, wherein said raised boss is received by said recessed channel for the assembly of said wiping element into said wiper retainer member.

7. The windshield wiper insert of claim 6 which further includes a resilient force distribution member cooperatively arranged with said wiper retainer member and suitably designed for receipt at opposite ends within said superstructure, said resilient force distribution member being flexible in a plane perpendicular to the wiped surface of a windshield from an unbiased configuration wherein its top surface is planar and its bottom surface is convexly curved along the length to a biased configuration wherein said top surface is convexly curved along the length.

8. The windshield wiper insert of claim 6 wherein said wiping element is part-cylindrical, and said substantially flat surface is coincident with a diameter of said part-cylindrical member wherein said substantially parallel slits are arranged substantially normal to said flat surface.

9. The windshield wiper insert of claim 7 wherein said wiper retainer member and said part-cylindrical wiping element are each fabricated from rubber, wherein the durometer of said wiper retainer member is at least twice the durometer of said part-cylindrical wiping element.

* * * * *